(12) United States Patent
Yami et al.

(10) Patent No.: US 7,784,087 B2
(45) Date of Patent: Aug. 24, 2010

(54) SYSTEM AND METHOD FOR SECURELY SHARING ELECTRONIC DOCUMENTS

(75) Inventors: Sameer Yami, Irvine, CA (US); Peter Tran, Garden Grove, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 1420 days.

(21) Appl. No.: 11/197,112

(22) Filed: Aug. 4, 2005

(65) Prior Publication Data

US 2007/0033637 A1    Feb. 8, 2007

(51) Int. Cl.
*G06F 21/00* (2006.01)
*H04L 29/06* (2006.01)
(52) U.S. Cl. ............................... 726/4; 726/21; 713/185
(58) Field of Classification Search .................. 713/156, 713/173, 182, 184, 185, 189, 193; 726/3, 726/4, 17, 2, 21, 27, 28; 358/1.15, 400, 200, 358/5.8
See application file for complete search history.

(56) References Cited

U.S. PATENT DOCUMENTS

| | | | |
|---|---|---|---|
| 6,804,705 B2 | 10/2004 | Greco et al. | |
| 6,839,843 B1 | 1/2005 | Bacha et al. | |
| 7,587,045 B2* | 9/2009 | Yeung et al. | 380/43 |
| 2002/0016921 A1 | 2/2002 | Olsen et al. | |
| 2002/0035697 A1 | 3/2002 | McCurdy et al. | |
| 2002/0120858 A1 | 8/2002 | Porter et al. | |
| 2003/0028664 A1 | 2/2003 | Tan et al. | |
| 2003/0044009 A1 | 3/2003 | Dathathraya | |
| 2003/0126458 A1* | 7/2003 | Teramoto et al. | 713/194 |
| 2004/0179220 A1* | 9/2004 | Van Oosterhout | 358/1.13 |
| 2005/0018237 A1 | 1/2005 | Cossel et al. | |

* cited by examiner

*Primary Examiner*—Gilberto Barron, Jr.
*Assistant Examiner*—Abdulhakim Nobahar
(74) *Attorney, Agent, or Firm*—Tucker Ellis & West, LLP

(57) ABSTRACT

A system and method for the selective sharing of an electronic document. The method enables a user to share access to an electronic document stored on a repository on a document management system. A user, via a document processing services network, generates a password and token corresponding to the document to be shared. The token provides information regarding the electronic document to be shared and the way the shared document will be made available to other users. The user then gives the token along with the password to the other users desiring to have access to the shared document. The other users are then able to retrieve the electronic document via email, viewing on a web browser, or printing at a multifunction peripheral device.

16 Claims, 6 Drawing Sheets

SYSTEM AND METHOD FOR SECURELY SHARING ELECTRONIC DOCUMENTS

BACKGROUND OF THE INVENTION

This invention is directed to a system and method for document management. More particularly, this invention is directed to a system and method for selectively sharing one or more secure electronic documents.

Typically, professionals or other users routinely access documents or other data while away from their office environment. These users need to generate or propagate data, such as image data, by printing a document, and then need to distribute or perform other functions on such image data. Access by these users is suitably accomplished via a laptop computer, tablet computer, personal data assistant, cellular telephone and the like. Multifunction peripheral devices, such as printers, facsimile machines, copy machines, and scanners, routinely perform such operations. Document management systems allow a remote user to access his stored documents from a remote location, however such systems do not take into account the limited processing power and storage of portable electronic devices. Thus, a user is not able to download a document from the system and transmit the document as an attachment to an email to a third party user. Furthermore, when the user desires to only submit a hard copy to a third party, limiting access to the electronic version of the document, the user is typically required to print a copy and have the copy delivered. This is time consuming and expensive for the user. Thus, a user is not able to conveniently deliver a document without first printing the document out.

There is a need for a system and method for securely and selectively sharing access to electronic documents.

SUMMARY OF THE INVENTION

In accordance with the present invention, there is provided a system and method for document management.

Still further, in accordance with the present invention, there is provided a system and method for selectively sharing secure documents.

Still further, in accordance with the present invention, there is provided a system for the selective sharing of electronic documents. The system includes receiving means adapted to receive a share request representing at least one selected electronic document for which sharing is desired. The system also includes a key generator adapted for generating a key. The key suitably includes a token and a password, which allows for selective access to the at least one selected electronic document. The key generator includes a token generator adapted for generating the token. The token is advantageously generated in accordance with a received share request, and includes encrypted data representing the association of generated token data with the at least one selected electronic document as specified by the received share request. The key generator further includes a password generator for generating a password. The password is associated with the token generated in accordance with the received share request data. The system further includes key output means adapted to communicate the generated key to an associated user and key input means adapted to receive the key from an associated requestor. The system also includes document release means adapted to release the at least one selected electronic document associated with the received key to the associated requestor.

Still further, in accordance with the present invention, there is provided a method for the selective sharing of electronic documents. The method begins with the receiving of a share request representing at least one selected electronic document for which selective sharing is desired. A key is then generated including a token and a password. The key allows for the selective accessing of the selected electronic document. The token is generated according to the received share request and includes encrypted data representing the association of the generated token data with the selected electronic document, as specified by the share request. The password is then generated and associated with the token according to the received share request data. The generated key is then communicated to an associated user. The key is then received from an associated requestor and access to the selected electronic document is subsequently released to the associated requestor based on the received key.

Still other advantages, aspects and features of the present invention will become readily apparent to those skilled in the art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description, serve to explain the principles of the invention.

DETAILED DESCRIPTION OF THE PREFERRED EMBODIMENT

The present invention is directed to electronic document management. More particularly, the present invention is directed to a system and method for securely and selectively sharing electronic documents.

Figure 1:
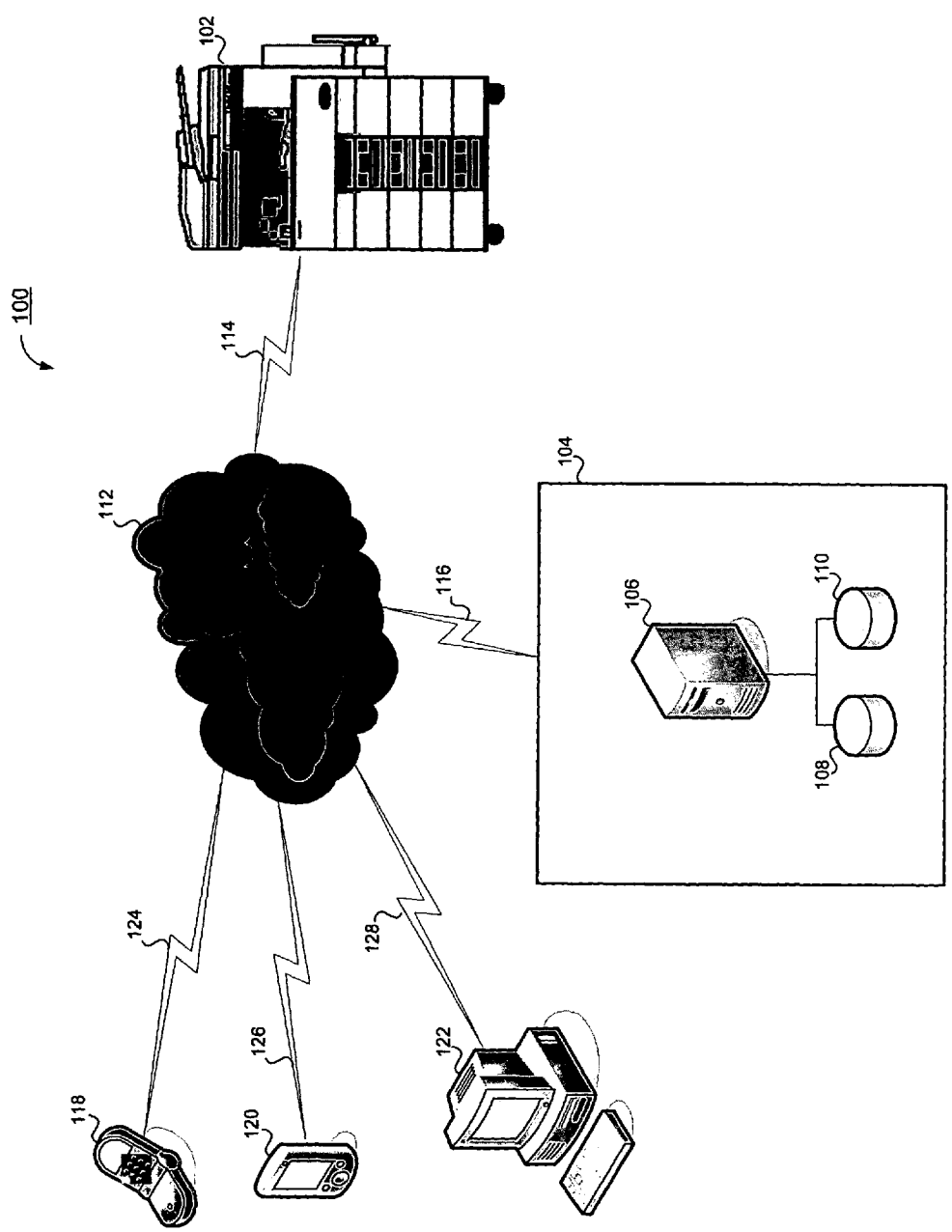
FIG. 1 is a block diagram illustrating a system in accordance with the present invention.

Turning now to FIG. 1, there is shown a diagram illustrating a system 100 in accordance with the present invention. As depicted in FIG. 1, a user is provided access to a document processing device, illustrated by the multifunction peripheral device 102, for generating or processing image data. It will be understood by those skilled in the art that the document processing device is any suitable document processing device known in the art, including, without limitation, a copier, printer, scanner, facsimile, multifunction peripheral, and the like, or any combination thereof. Suitable commercially available document processing devices include, but are not limited to, the Toshiba e-Studio Series Controller.

Preferably, the user accesses the device 102 in a non-office environment, such as an airport lounge, retail establishment, business center, self-contained kiosk, and the like. As shown in FIG. 1, the multifunction peripheral device 102 is in data communication with a document management system 104. As will be understood by those skilled in the art, a document management system provides a system for organizing, storing, creating, printing, faxing, scanning, and viewing documents. In accordance with the present invention, the multifunction peripheral device 102 and the document management system 104 suitably communicate via a computer network 112. As will be appreciated by those skilled in the art, the computer network 112 is any computer network known in the art, including, without limitation, a wide area network, a local area network and the Internet. In the preferred embodiment, the multifunction peripheral device 102 and the document management system 104 are suitably located remote from each other. More preferably, the computer network 112 is the Internet.

As illustrated in FIG. 1, the multifunction peripheral device 102 communicates with the computer network 112 via a communications link 114. It will be understood by those skilled in the art that the communications link 114 is any means for communication between two electronic devices, for example and without limitation, an Ethernet based connection, an infrared connection, a Bluetooth connection, a Wi-Fi connection, an IEEE802.11(x) connection, a telephonic connection, a cellular based connection, and the like, or a combination thereof. In the preferred embodiment, the multifunction peripheral device 102 and the document management system 104 are advantageously a part of multifunction peripheral devices and document management systems providing fee-based and non-fee based document processing services to users from remote locations.

The document management system 104 suitably communicates with the computer network 112 via a communications link 116. As will be appreciated by those skilled in the art, the communications link 116 is any means for communication between two electronic devices, including, and without limitation, infrared, Bluetooth, Wi-Fi, IEEE802.11(x), telephone, cellular, Ethernet and the like, or any combination thereof. The document management system 104 suitably includes a server 106. It will be understood by those skilled in the art that the document management system 104 is capable of including more than one server, with each server performing a different function, aspects of a function, or the same function in tandem. The skilled artisan will understand that for example purposes only, the present invention employs a single server 106. The server 106 is operatively connected to one or more file repositories, illustrated in FIG. 1 as 108 and 110. The file repositories 108, 110 suitably contain one or more electronic files, preferably corresponding to a particular user, group of users, division, and the like. It will be appreciated by those skilled in the art that such electronic files are capable of being generated by a word processing program, a spreadsheet program, a photographic editing program, a computer aided design program, and the like. For purposes of explanation herein, an electronic document corresponds to any electronic file stored in the repositories 108, 110.

In the preferred embodiment, the repositories 108 and 110 are suitably stored in memory associated with the server 106. However, it will be understood by those skilled in the art that the repositories 108, 110 are capable of being stored on storage medium communicatively coupled to the server 106, such as one or more hard disk drives, optical drives, magnetic tape drives, non-volatile memory and the like, located internally or externally, or connected to the server 106 via the computer network 112. In addition thereto, the skilled artisan will appreciate that in one embodiment, the repositories 108, 110 are suitably located in proximity to memory associated with the multifunction peripheral device 102. Preferably, the electronic documents stored in the repositories 108, 110 are suitably indexed and stored in accordance with the document management system 104 procedures for data storage.

In accordance with the present invention, the system 100 further includes one or more user devices, capable of interacting with the multifunction peripheral device 102 and the document management system 104. As illustrated in FIG. 1, the system 100 includes a web-enabled cellular telephone 118, a personal data assistant 120 and a personal computer 122. The web-enabled cellular telephone 118, commonly referred to as a smart phone, suitably communicates with the multifunction peripheral device 102 and the document management system 104 over the computer network 112 via a communications link 124. As will be appreciated by those skilled in the art, the communications link 124 is any suitable means for communication between two electronic devices, as discussed above. For example, the web-enabled cellular telephone 118 is capable of employing a cellular-based communications link 124 with the computer network 112 and through the network 112, communicating with the multifunction peripheral device 102 and the document management system 104.

The personal data assistant 120 communicates with the computer network 112 via a communications link 126. It will be understood that the communications link 126 is any suitable means known in the art capable of establishing communication between two electronic devices. For example, the personal data assistant 120 is capable of employing a cellular-based communications link 126 to communicate with document management system 104 and the multifunction peripheral device 102, or alternatively, the personal data assistant 120 is equipped with a suitable wireless interface such that the communications link 126 is an IEEE802.11(x) wireless connection. The personal computer 122 also suitably communicates with the multifunction peripheral device 102 and the document management system 104 via a suitable communications link 128. The communications link 128 is any means known in the art of communication between two electronic devices. As will be appreciated by those skilled in the art, the communications link 128 is capable of being employed as a wired connection, wireless connection, and the like. The skilled artisan will appreciate that although a desktop computer is illustrated in FIG. 1, the present invention is not limited to a desktop and a laptop or notebook computer is equally capable of interacting with the system 100.

Returning to the document management system 104 of the system 100, the skilled artisan will appreciate that the document management system 104 employs one or more forms of authentication to restrict access to documents stored in the repositories 108, 110. In the preferred embodiment, the document management system 104 requires that a user be authorized to access one or more documents stored in the repositories 108, 110. In accordance with the present invention, the electronic documents stored in the repositories 108, 110 are capable of being selectively shared with unauthorized parties, i.e., parties that are not authorized to access the document management system 104.

In order to more easily describe the present invention, an embodiment will now be described wherein the web-enabled cellular telephone 118 is suitably operated by an authorized user of the document management system 104, the personal data assistant 120 is suitably operated by a second authorized user of the document management system 104, and the personal computer 122 is suitably operated by a unauthorized user, i.e., a user that does not have access to the document management system 104. As previously stated, the multifunction peripheral device 102 and the document management system 104 are advantageously connect to a document processing services network (not shown).

In accordance with this embodiment, the authorized, or registered user, via the web-enabled cellular telephone 118, desires to share an electronic document stored on the user's repository 108 with the unauthorized user. The skilled artisan will appreciate that in accordance with the document processing services network, the unauthorized user is suitably described as a non-subscribing or non-paying entity to the network and as such, cannot access the electronic documents stored by the document management system 104. When the authorized user 118 desires to share an electronic document contained in the user's repository 108, the user 118 first selects the desired document by any suitable means from those electronic documents stored in the repository 108.

Once a document to be shared has been selected, the user 118 sets the share details, e.g., parameters, regarding how the document is to be accessed and used by the unauthorized user 122 or the other authorized user 120. For example, the user 118 is able to specify the name of the intended recipient, the user identification of the receiving party when the receiving party is a registered/authorized user, a password, the time during which the document will be available to the receiving user, the number of times the document is able to be accessed by the receiving user, watermark text or figures that will be printed on the document, the type of acceptable identification the receiving user must provide, finishing details, rendering formats and the like. These details, which will be discussed further, are encoded into a markup language format token, such as an extensible markup language format, and encrypted using the password supplied above. It will be appreciated that in addition to allowing the authorized user 118 to submit a password, the document management system 104 is also able to generate a password for use in the encryption/decryption of the share details. In addition, a document identification number is suitably generated by the server 106 of the document management system 104, or alternatively, by one of the other devices resident on the document processing services network, for example, and without limitation, the multifunction peripheral device 102, and the like. It will be understood by those skilled in the art the identification number is associated with the token. The encrypted token and the identification number are then stored in associated memory. Preferably, the document management system 104, and in particular the server 106, stores the identification number and the associated encrypted token.

The user 118 is then able to transfer to the unauthorized user 122 the password and the identification number corresponding to the document to be shared. Preferably, the unauthorized user through the personal computer 122 receives the password and identification number via any means known in the art. For example and without limitation, the password and identification number are capable of being sent to the unauthorized user 122 in the form of an electronic mail message forwarded by the user 118. Alternatively, should the unauthorized user 122 lack email capabilities, the password and document identification number are capable of being manually given to the unauthorized user 122 by the user 118. Once the document identification number and the password have been received by the unauthorized user 122, the document is able to be accessed.

To access the electronic document, the unauthorized user 122 first establishes a communications channel with the document processing services network, preferably via the computer network 112. In this example, the personal computer 122 connects to the document processing services network via the Internet. A suitable web browser, as is known in the art, is used by the personal computer 122 to access the document management system 104. The unauthorized user 122 then inputs the document identification number and the password. Alternatively, an unauthorized user is able to access the document by entering, at the multifunction peripheral device 102, the document identification number and password. In either event, the password is used to decrypt the token containing the share details, which define the manner in which the shared document is to be accessed by the unauthorized user 122. Upon receipt of the password and document identification number, the multifunction peripheral device communicates them to the server 106 of the document management system 104. The document identification number is used to retrieve the corresponding token from storage. The retrieved token is then sent to the multifunction peripheral device 102 and decrypted using the password and sent to the server 106. The designated electronic document is then retrieved from the repository 108 by the server 106. The share details and the document are then returned to the multifunction peripheral device 102 for the unauthorized user 122 to view, print, fax, or otherwise use the document in accordance with the limitations imposed by the share details.

When the unauthorized user 122 is located remotely from the multifunction peripheral device 102, the foregoing process is undertaken by the server 106 of the document management system 104. In such circumstances, upon entering the appropriate password and identification number, the token corresponding to thereto is retrieved and decrypted using the password by the server 106. The associated electronic document is then retrieved from the repository 108 and forwarded to the unauthorized user 122. When the receiving user is a user authorized to access the document processing services network, for example the personal data assistant 120, the shared document is sent to the appropriate multifunction peripheral device in accordance with the share details. Alternatively, the electronic document is forwarded to the personal data assistant 120 for display in accordance with the share details. Preferably, when the electronic document is to be transmitted to the personal data assistant 120, the share details of the associated token indicate an email address corresponding to the authorized user 120. In one embodiment, the shared document is transmitted to the authorized user 120 personal repository 110, for later access.

Figure 2:
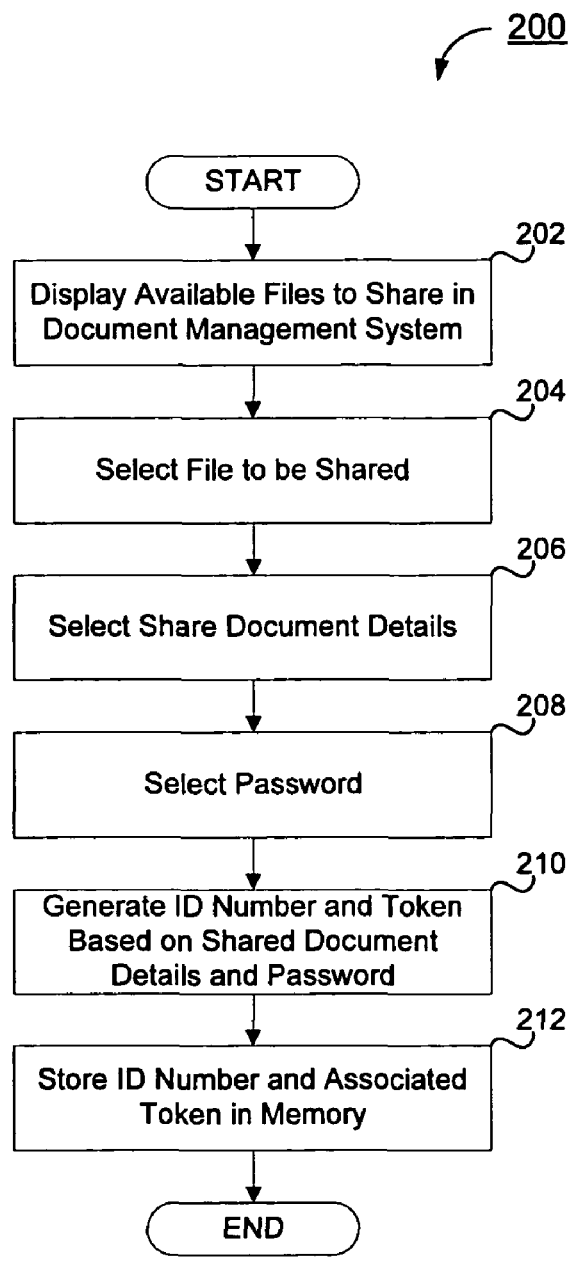
FIG. 2 is a flow chart illustrating a token generation method in accordance with the present invention.

The foregoing description of the system 100 of the present invention will better be understood in connection with the flow charts illustrated in FIGS. 2, 3, 4 and 5. Turning now to FIG. 2, there is shown a flow chart 200 illustrating the selection of a document to be shared by an authorized user 118. Beginning at step 202, an authorized user 118 accesses the document management system 104 and receives a list of files contained in the user's repository 108. As will be appreciated by those skilled in the art, the files contained in the repository 108 are any suitable electronic file stored in the document management system 104 attributable to the user 118. The user 118 then selects, at step 204, at least one of the files from the list to be shared. The share details are then selected by the user at step 206 corresponding to the selected electronic file. In a preferred embodiment, the user 118 is presented with a graphical user interface displaying the details available for selection. As previously discussed, the type of share details varies in accordance with the intended recipient of the file.

For example, the share details are capable of including, without limitation, the name of the user, authorized or unauthorized, designated as the recipient; in the case of an authorized user, that user's ID for the document processing services network; the time during which the document will be available to the other user or if the token is to be invalidated as soon as it is used; the number of times of the document is allowed to be accessed; any watermark text that needs to be printed on the document; the type of identification that the other user is required to supply before the user is allowed to access the document, such as: document identification number/supplied password, registered user ID/password/supplied password, credit card swipe/supplied password, and the like; specific finishing details, such as stapling, color, fonts, that are available on the multifunction peripheral device 102; and rendering options, which specifies whether the document is limited to printed output, Internet viewing, or a combination of both. In one embodiment, the owner, i.e., original author/user sharing the document, name and the document name are automatically added to the details during the detail selection.

Once the details have been selected, the user 118 selects a password at step 208. As will be appreciated by those skilled in the art, the server 106 is suitably adapted to automatically generate a password, thereby obviating the need for the user 118 to select a password. A document identification number and token are then generated by the document management system 104, via server 106, based upon the share details and the password. It will be understood by those skilled in the art that the token is suitably encrypted using the aforementioned password. In the preferred embodiment, the token is a markup language file suitably containing the share details, document identification and other information relating to the shared document. In the preferred embodiment, the token is an extensible markup language format file. Those skilled in the art will appreciate that any means of encryption is capable of being employed by the present invention to encrypt the token, and the present invention is not limited solely to the use of password-based encryption techniques.

Following generation of the encrypted token and document identification number, the method proceeds to step 212. At step 212, the document identification number and encrypted token are suitably stored in associated memory. Preferably, the document identification number and encrypted token are stored, along with the time period details, in a memory associated with the server 106 of the document management system 104 on the document processing services network. In accordance with the present invention, time period details suitably refer to the period of time in which the token will remain active, e.g., the time period during which the document is to be shared, or the number of times the document is allowed to be accessed. The selected document is then ready to be shared with both authorized users and unauthorized users, in accordance with the instructions provided by the authorized user to generate the encrypted token.

Figure 3:
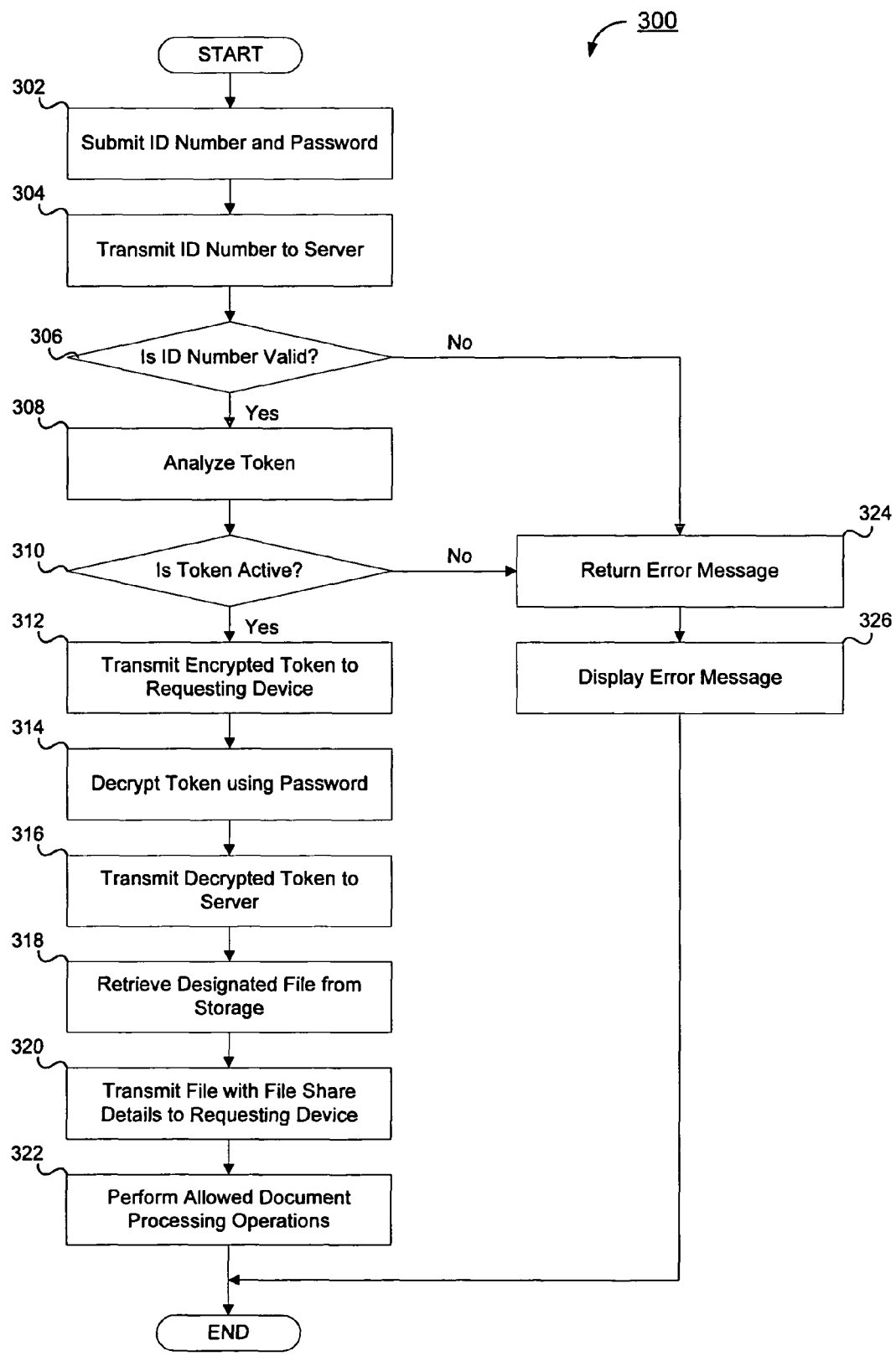
FIG. 3 is a flow chat illustrating an electronic document sharing method in accordance with the present invention.

Referring now to FIG. 3, there is shown a flow chart 300 illustrating a retrieval of a shared document in accordance with the present invention. Beginning at step 302, the document identification number and corresponding password are submitted to the multifunction peripheral device 102. In the preferred embodiment, the receiving user, either authorized or unauthorized, is located at the multifunction peripheral device 102. In one embodiment, the personal data assistant 120 receives the document identification number and corresponding password. In another embodiment, the personal computer 122 receives the password and document identification number. Once entered, the document identification number is transmitted at step 304 to the server 106 of the document management system 104 on the document processing services network. As will be understood by those skilled in the art, the document identification number is suitably submitted via the Internet, via the computer network 112, and the like. For purposes of explanation herein, the terms 'requesting device' and 'receiving user' refer to both the authorized and unauthorized users requesting, i.e., the requesting user, access to a shared document via the personal data assistant 120 and the personal computer 122, respectively.

As discussed above, an unauthorized user is able to access the shared document by inputting the document identification number and the password at the multifunction peripheral device 102. Alternatively, the unauthorized user inputs the password and document identification number at the personal computer 122, which transmits the identification number to the document management system 104 on the document processing services network. In another embodiment, the authorized user submits the password and identification number to the personal data assistant 120, which transmits the identification number to the server 106 of the document management system 104 on the document processing services network.

The server 106 then determines at step 306 whether the document identification number received from the receiving user is valid. When the document identification number received from the receiving user is not valid, either the authorized or unauthorized user, flow proceeds to step 324, wherein an error message is returned. The error message is then displayed at step 326 and the share operation terminates. It will be understood by those skilled in the art that the receiving user is capable of resubmitting the document identification number upon the receipt of an invalid error message. The skilled artisan will appreciate that the error message is suitably displayed on the personal computer 122, the personal data assistant 120, or the multifunction peripheral device 102. Preferably, when the error message is displayed at the multifunction peripheral device 102, it is displayed on an associated user interface, such as for example and without limitation, a graphical user interface in the form of a touch screen display, and the like.

When the server 106 determines that the identification number is valid, flow proceeds to step 308 wherein the server 106 analyzes the token associated with the identification number. As previously discussed, the token is stored at the server 106 and is associated thereon with the identification number. A determination is then made at step 310 to determine whether the token is active. It will be understood by those skilled in the art that an active token is a token which has not expired in response to the elapsing of a predetermined period of time, a predetermined number of accesses, and the like. In accordance with the present invention, when the token is no longer active, flow proceeds to step 324, wherein an error message is returned to the requesting device. The requesting device then displays the error message at step 326 and the process terminates.

When the token is still active, flow proceeds to step 312, wherein the encrypted token, stored in associated memory, is transmitted to the requesting device. Thus, when the receiving user is located at the multifunction peripheral device 102, the encrypted token is transmitted to the multifunction peripheral device 102 for further processing. In one embodiment, when the receiving user is located at the computer 122, which is not associated with the document management system 104, the encrypted token is decrypted by the server 106 of the document management system 104. The related document is then transmitted, along with the rendering information corresponding to the decrypted token, to the requesting device 122. It will be appreciated by those skilled in the art that the authorization of a device to receive an encrypted token and perform decryption thereon is advantageously set by an administrator. In addition, the administrator is capable of determining whether the receiving device decrypts the token based on the device capabilities. For example, when the requesting device is the personal data assistant 120, it has been predetermined by the administrator that the device 120 lacks the processing power to suitably decrypt the token and therefore the server 106 decrypts the token. In the preferred embodiment, when the receiving user is the personal computer 122, the encrypted token is transmitted to the personal computer 122. Similarly, when the receiving user is the personal data assistant 120, the encrypted token is transmitted to the personal data assistant 120. Upon receipt, the token is decrypted using the submitted password at step 314.

The requesting device then transmits the decrypted token to the server 106 at step 316. It will be understood by those skilled in the art that the decrypted token suitably contains share details necessary for the server 106 to retrieve the shared document from the repository 108. The server 106 then retrieves the electronic document designated by the document identification number and the decrypted token from the repository 108 at step 318. The retrieved electronic document and the corresponding share details are then transmitted to the requesting device at step 320. In accordance with the preferred embodiment of the present invention, the retrieved document and share details are transmitted to the multifunction peripheral device 102. Upon receipt of the electronic document and the share details, the allowed document processing operation or operations are performed in accordance with the capabilities of the requesting device and the share details at step 322.

Figure 4:
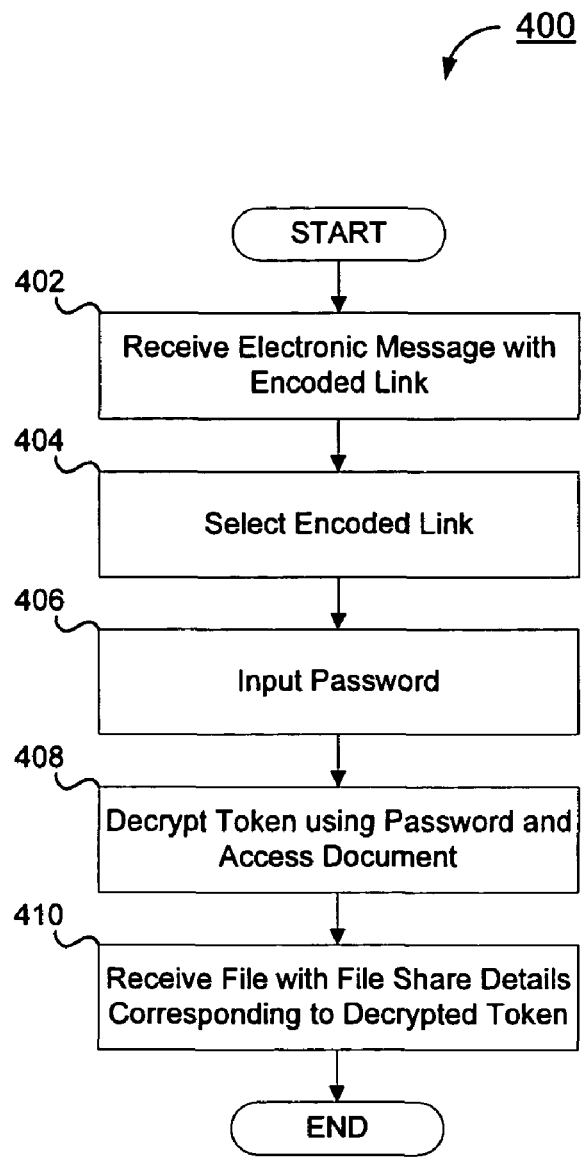
FIG. 4 is a flow chart illustrating an electronic document sharing method in accordance with the present invention.

Turning now to FIG. 4, there is shown a flow chart 400 illustrating a method for accessing a shared document in accordance with the present invention. The flow chart 400 illustrates a method for accessing a shared document via email. Preferably, this method is implemented by an authorized user via the personal data assistant 120 or by an unauthorized user via the personal computer 122. Beginning at step 402, the requesting device receives an electronic message containing an encoded link. The encoded link preferably is a hypertext link to the shared document stored in the repository 108 of the document management system 104. Those skilled in the art will appreciate that other methods of linking to the shared document are also capable of being employed in accordance with the present invention. The user then selects the encoded link at step 404 via any means known in the art. It will be understood by those skilled in the art that the selection of the link suitably establishes a connection between the requesting device and the server 106, in accordance with the methods discussed above.

The user inputs the password corresponding to the shared document designated by the link at step 406. In accordance with the preferred embodiment, the authorized user 120 suitably uses his document processing services network password or a password that was previously received from the user 118. In one embodiment, the unauthorized user 122 suitably receives a password corresponding to the shared document from the user 118 by a previous or subsequent electronic message, or other means known in the art. The server 106, upon receipt of the password, decrypts the token associated with the encoded link and corresponding to the submitted password at step 408. The share details and corresponding electronic document are then retrieved by the server 106 from the repository 108 at step 410. It will be appreciated by those skilled in the art that further processing operations of the retrieved electronic document are then undertaken in accordance with the method described above with respect to FIG. 3.

Figure 5:
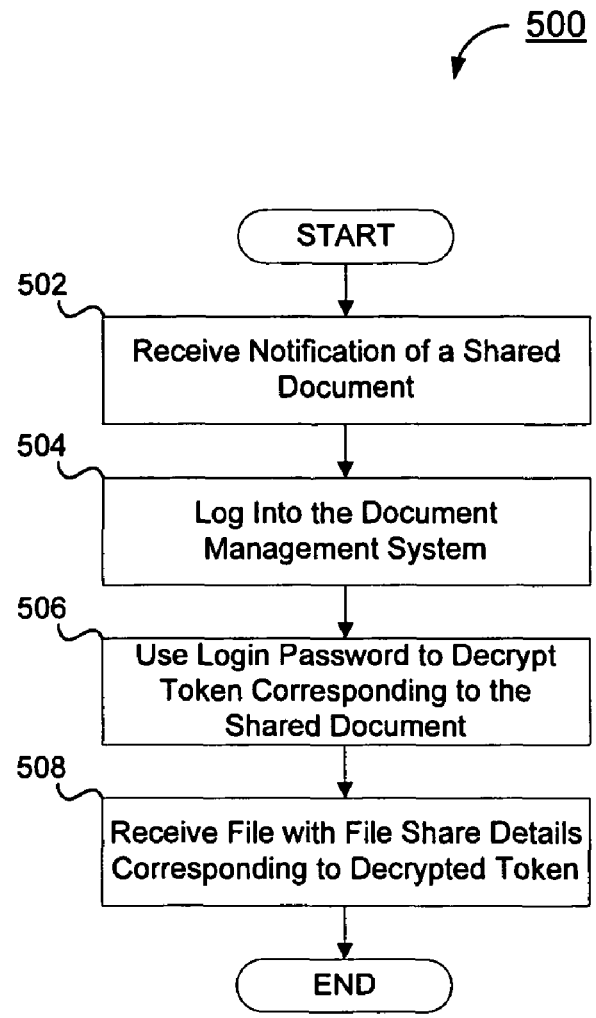
FIG. 5 is a flow chart illustrating an electronic document sharing method in accordance with the present invention.

Referring now to FIG. 5, there is shown a flow chart 500 illustrating a method for accessing a shared document in accordance with the present invention. The skilled artisan will appreciate the flow chart 500 is advantageously applied to those authorized users of the document processing services network. However, in accordance with the present invention, those unauthorized users are equally capable of being notified as set forth in FIG. 5. Beginning at step 502, the personal data assistant 120 of the authorized user receives a notification of a shared document. It will be understood by the skilled artisan that the notification is any means of notification known in the art including, without limitation, text messaging, email messaging and the like.

Following receipt of the notification message, the user then logs into the document management system 104 at step 504. It will be appreciated by those skilled in the art that the logging into the document management system 104 suitably entails logging into the document processing services network, as discussed above. Upon successful logon, the server 106 of the document management system 104 decrypts the token corresponding to the document notification at step 506. The logon password for the authorized user is used by the server 106 to decrypt the encrypted token, which contains share details and information related to the shared document. The authorized user is then able to access, at step 508, the shared document in accordance with the share details in the decrypted token.

Figure 6:
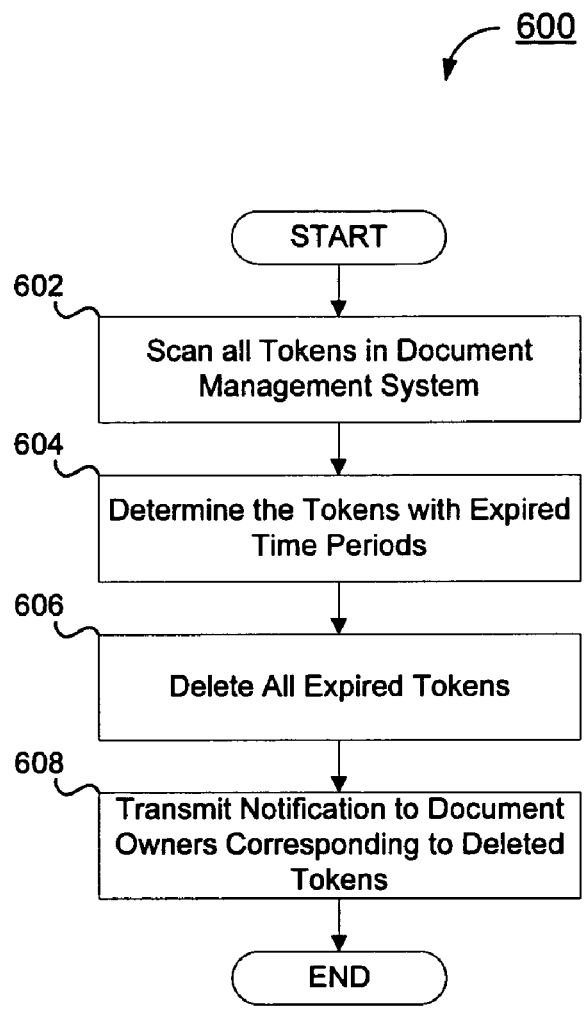
FIG. 6 is a flow chart illustrating an electronic document sharing method in accordance with the present invention.

Turning now to FIG. 6, there is shown a flow chart 600 illustrating a method for removing invalid tokens from the document management system 104. The method begins at step 602, wherein the server 106 scans all tokens present in the document management system 104. It will be understood by those skilled in the art that the server 106 is used herein for explanation purposes only, and the method of FIG. 6 is capable of being implemented using suitable hardware, software, or any combination thereof, as is known in the art. Flow then proceeds to step 604, wherein those tokens with expired time periods are determined from the scanned tokens. At step 606, the tokens with expired time periods are deleted from the document management system 104 using any means known in the art. The owners of the documents to which the deleted tokens referred are then notified at step 608. Preferably, the owners receive a suitable transmission, such as a text message, electronic mail message, and the like, indicating the deletion of the token. It will be understood by those skilled in the art that the foregoing method is equally adaptable to delete those decrypted files, documents, and the like, corresponding to elapsed time periods. Suitable notification to the owners of such decrypted files and documents follows the deletion.

The invention extends to computer programs in the form of source code, object code, code intermediate sources and object code (such as in a partially compiled form), or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program, for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed:

1. A system for selective sharing of electronic documents comprising:
    means for receiving a share request representative of at least one selected electronic document for which selective sharing is desired;
    a key generator adapted for generating a key, which key includes a token and a password, to allow for selective access to the at least one selected electronic document, the key generator including,
        a token generator adapted for generating the token in accordance with received share request, which token includes encrypted data representative of association of generated token data with the at least one selected electronic document as specified by a received share request, and
        a password generator for generating a password, which password is associated with a token generated in accordance with the received share request data;
    key output means for communicating the key to an associated user;
    key input means for receiving the key from an associated requestor;
    determining means for determining a condition as a one of active or expired of a token of the key received from the associated requestor; and
    document release means for releasing, to the associated requestor, access to the at least one selected electronic document associated with the received key in accordance with the determining means determining the active condition of the token.

2. The system for selective sharing of electronic documents of claim 1 wherein the selective access includes at least one of the document identification, access frequency, and selected retrieval methods.

3. The system for selective sharing of electronic documents of claim 2, wherein the selective access further includes of at least one of the group consisting of an acceptable user identification, a watermark, a rendering option, and a finishing option.

4. The system for selective sharing of electronic documents of claim 1, wherein the at least one selected electronic document is selected from a list of documents associated with the associated user.

5. A method for selective sharing of electronic documents comprising the steps of:
    receiving a share request representative of at least one selected electronic document for which selective sharing is desired, wherein an authorized user sets share details parameters which are encoded into a markup language format token, regarding how an electronic document to be accessed and used by an unauthorized user or another authorized user;
    generating, via a processor operating in connection with instructions stored in an associated memory, a key, which key includes the token and a password, to allow for selective access rights to the at least one selected electronic document based on a preselected temporal access condition of the electronic document and at least one preselected non-temporal access condition of the electronic document, the key generation including,
        generating the token in accordance with the received share request, which token includes encrypted data representative of association of generated token data with the at least one selected electronic document as specified by the received share request and an identity of at least one selected associated user, and
        generating the password, which password is associated with the token generated in accordance with the received share request data;
    communicating the key to the associated user;
    determining whether the token associated with the key received from the associated user is active in accordance with the identity; and
    releasing, to the associated user, access to the at least one selected electronic document associated with the received key in accordance with a determination of the active condition of the token.

6. The method for selective sharing of electronic documents of claim 5, wherein the selective access includes at least one from the group consisting of document identification, access frequency, and selected retrieval methods.

7. The method for selective sharing of electronic documents of claim 6, wherein the selective access includes at least one of the group consisting of acceptable requestor identification, watermark options, rendering options, and finishing options.

8. The method for selective sharing of electronic documents of claim 5, wherein the at least one selected electronic document is selected from a list of documents associated with the associated user.

9. A computer-implemented method for selective sharing of electronic documents comprising the steps of:
    receiving a share request representative of at least one selected electronic document for which selective sharing is desired, wherein an authorized user sets share details parameters which are encoded into a markup language format token, regarding how an electronic document to be accessed and used by an unauthorized user or another authorized user;
    generating, via a processor operating in connection with instructions stored in an associated memory, a key, which key includes the token and a password, to allow for selective access rights to the at least one selected electronic document based on a preselected temporal access condition of the electronic document and at least one preselected non-temporal access condition of the electronic document, the key generation including,
        generating the token in accordance with the received share request, which token includes encrypted data representative of association of generated token data with the at least one selected electronic document as specified by the received share request and an identity of at least one selected associated user, and
        generating the password, which password is associated with the token generated in accordance with the received share request data;
    communicating the key to the associated user;

determining whether the token associated with the key received from the associated user is active in accordance with the identity; and releasing, to the associated user, access to the at least one selected electronic document associated with the received key in accordance with a determination of the active condition of the token.

10. The computer-implemented method for selective sharing of electronic documents of claim 9, wherein the selective access includes at least one from the group consisting of document identification, access frequency, and selected retrieval methods.

11. The computer-implemented method for selective sharing of electronic documents of claim 10, wherein the selective access includes at least one of the group consisting of acceptable requestor identification, watermark options, rendering options, and finishing options.

12. The computer-implemented method for selective sharing of electronic documents of claim 9, wherein the at least one selected electronic document is selected from a list of documents associated with the associated user.

13. A system for selective sharing of electronic documents comprising:

an input device operable for receiving a share request representative of at least one selected electronic document for which selective sharing is desired, wherein an authorized user sets share details parameters which are encoded into a markup language format token, regarding how an electronic document to be accessed and used by an unauthorized user or another authorized user;

a processor operating in connection with instructions stored in an associated memory, operable for generating a key, which key includes the token and a password, to allow for selective access rights to the at least one selected electronic document based on a preselected temporal access condition of the electronic document and at least one preselected non-temporal access condition of the electronic document, the key generation including, the processor further operable for generating the token in accordance with the received share request, which token includes encrypted data representative of association of generated token data with the at least one selected electronic document as specified by the received share request and an identity of at least one selected associated user, and the processor further operable for generating the password, which password is associated with the token generated in accordance with the received share request data;

an output device operable for communicating the key to the associated user;

the processor further operable for determining whether the token associated with the key received from the associated user is active in accordance with the identity; and the processor further operable for releasing, to the associated user, access to the at least one selected electronic document associated with the received key in accordance with a determination of the active condition of the token.

14. The system for selective sharing of electronic documents of claim 13, wherein the selective access includes at least one from the group consisting of document identification, access frequency, and selected retrieval methods.

15. The system for selective sharing of electronic documents of claim 14, wherein the selective access includes at least one of the group consisting of acceptable requestor identification, watermark options, rendering options, and finishing options.

16. The system for selective sharing of electronic documents of claim 13, wherein the at least one selected electronic document is selected from a list of documents associated with the associated user.

* * * * *